US012285377B1

(12) United States Patent
Lu et al.

(10) Patent No.: US 12,285,377 B1
(45) Date of Patent: Apr. 29, 2025

(54) BITING MASSAGER

(71) Applicants: Shenzhen Jielangxun Technology Co., Ltd., Shenzhen (CN); Dongguan Rijie Electronic Technology Co., Ltd, Dongguan (CN)

(72) Inventors: Jiajie Lu, Mingguang (CN); Changbao Yin, Changde (CN)

(73) Assignees: Shenzhen Jielangxun Technology Co., Ltd., Shenzhen (CN); Dongguan Rijie Electronic Technology Co., Ltd, Dongguan (CN)

( * ) Notice: Subject to any disclaimer, the term of this patent is extended or adjusted under 35 U.S.C. 154(b) by 0 days.

(21) Appl. No.: 18/734,808

(22) Filed: Jun. 5, 2024

(30) Foreign Application Priority Data

Jan. 19, 2024 (CN) ......................... 202420137934.9

(51) Int. Cl.
*A61H 19/00* (2006.01)
*A61H 23/02* (2006.01)

(52) U.S. Cl.
CPC ......... *A61H 19/32* (2013.01); *A61H 23/0254* (2013.01); *A61H 2201/0153* (2013.01); *A61H 2201/1215* (2013.01); *A61H 2201/1664* (2013.01); *A61H 2201/1669* (2013.01); *A61H 2201/1692* (2013.01); *A61H 2205/087* (2013.01)

(58) Field of Classification Search
CPC ........ A61H 19/00; A61H 19/30; A61H 19/32; A61H 19/34; A61H 19/50; A61H 23/0254; A61H 2201/0153; A61H 2201/1215; A61H 2201/1667; A61H 2201/1669; A61H 2201/1692; A61H 2205/087
See application file for complete search history.

(56) References Cited

U.S. PATENT DOCUMENTS

| | | | | |
|---|---|---|---|---|
| 7,186,212 | B1 * | 3/2007 | McMullen | A63H 3/003<br>600/38 |
| 2019/0015291 | A1 * | 1/2019 | Sedic | A61H 19/34 |

FOREIGN PATENT DOCUMENTS

| | | | | |
|---|---|---|---|---|
| CN | 205108301 U | | 3/2016 | |
| CN | 205145073 U | | 4/2016 | |
| CN | 213490362 U | | 6/2021 | |
| CN | 117122505 | * | 11/2023 | A61H 19/30 |

* cited by examiner

*Primary Examiner* — Carrie R Dorna
(74) *Attorney, Agent, or Firm* — Nitin Kaushik

(57) ABSTRACT

Disclosed is a sexual stimulation device with an artificial lip structure, including the artificial lip structure, wherein the artificial lip structure includes upper and lower lip assemblies, and an opening defined by the upper and lower lip assemblies; at least one driving device, configured to drive the artificial lip structure to make a biting motion in a first direction; a power supply, configured to provide power to the at least one driving device; and an inner space, configured to accommodate the at least one driving device and the power supply. The sexual stimulation device can achieve the biting motion of the artificial lip structure, allowing a user to get relaxed in a short time.

14 Claims, 7 Drawing Sheets

BITING MASSAGER

CROSS-REFERENCE TO RELATED APPLICATIONS

The present application claims priority to Chinese Patent Application No. 2024201379349, filed on Jan. 19, 2024 and titled "BITING AND TWO-WAY FLAPPING VIBRATION MASSAGER", which is incorporated herein by reference in its entirety.

TECHNICAL FIELD

The present disclosure relates to the technical field of massagers, and in particular, to a biting massager.

BACKGROUND

In daily life, people are busy with work and have to withstand increasing pressure, especially office workers sitting at a desk all day long. Since they often type on a computer keyboard in a fixed posture, they may develop sub-health over time and need to get relaxed. However, rest time is limited; as a result, many healthcare products have appeared on the market, such as vibration massagers.

It is found through a literature search that Chinese Patent Announcement No. CN219814662U provides a massager with an up-down flapping function, which achieves working in different positions by starting different motors and can also start a swing rod to flap up and down separately on a skin surface to achieve a flapping massage effect when vibration is disabled; in addition, a first vibration motor and a second vibration motor can be started to achieve double vibration massage so that the massage can be performed at a single point or two points through the double vibration massage on the skin surface in accordance with human acupuncture points, thereby making it easy to use.

Although the above-mentioned patent can be used at a single point or two points through the double vibration massage and is easy to use, it still has the following problems: in actual use, a user cannot get relaxed quickly through vibration alone and therefore, if the user wants to get relaxed in a short time, the vibration frequency has to be increased, but a high frequency will make the user's experience poor and may even cause damage to the user's body; as a result, the need for relaxation in a short time cannot be met, further resulting in low flexibility in use. In view of the foregoing, the present disclosure provides a biting massager to solve the above problem.

SUMMARY

To overcome the above shortcomings, the present disclosure provides a biting massager intended to solve the problem that the prior art cannot meet the need for quick relaxation during use, thus resulting in low flexibility in use.

To achieve the above objective, the present disclosure provides a technical solution as follows:

a biting massager, including a handle, where the top of the handle is fixedly connected to a silicone leather sheath, a flapping assembly is installed on the right inner side of the silicone leather sheath, a first motor is fixedly connected to the left inner side of the silicone leather sheath, an output end of the first motor is fixedly connected to a rotating block, the upper side of the rotating block is fixedly connected to a connecting rod, the upper side of the connecting rod is fixedly connected to a mouth linkage, a second motor is fixedly connected to the upper left inner side of the silicone leather sheath, a driving block is installed on the upper left side of the handle, a PCBA board is fixedly connected to the left side of the silicone leather sheath, a battery is fixedly connected to the inside of the silicone leather sheath, and a magnetic charging needle is fixedly connected to the right side of the silicone leather sheath.

Further, the flapping assembly includes a third motor, two massage blocks, and a motor cover, where the third motor is fixedly connected to the right inner side of the silicone leather sheath, an output end of the third motor is fixedly connected to a rotating shaft, the outside of the rotating shaft is rotatably connected to two swing arms, the two massage blocks are respectively arranged on the left and right sides of the silicone leather sheath, the outside of the motor cover is fixedly connected to the upper inner side of the silicone leather sheath, and a fourth motor is fixedly connected inside the motor cover.

Further, the outside of the rotating block is movably connected to the inside of the silicone leather sheath, and the outside of the connecting rod is rotatably connected to the inside of the silicone leather sheath.

Further, the outside of the mouth linkage is movably connected to the inside of the silicone leather sheath, and an output end of the second motor is fixedly connected to the upper side of the mouth linkage.

Further, an output end of the fourth motor is in contact with the inner sides of the swing arms.

Further, the outside of the rotating shaft is rotatably connected to the inside of the silicone leather sheath, and the outsides of the swing arms are slidably connected to the inside of the silicone leather sheath.

Further, the inner sides of the massage blocks are in contact with the outer sides of the swing arms.

Further, the battery is electrically connected to the third motor, the fourth motor, the first motor, and the second motor.

The present disclosure has the following beneficial effects:

1. in the present disclosure, through the cooperation of the first motor, the rotating block, the connecting rod, the mouth linkage, the second motor, and other structures, a rotational motion is converted into an up-and-down swinging motion and a unilateral biting motion and vibration are achievable; in addition, the vibration and the biting motion can work separately or jointly through a driving plate, thereby achieving relaxation in a short time; and
2. in the present disclosure, through the cooperation of the third motor, the rotating shaft, the swing arms, the massage blocks, the motor cover, the fourth motor, and other structures, the massage blocks and the upper side of the silicone leather sheath are driven to shake, thereby achieving rapid flapping and working separately or jointly with flapping, further improving flexibility in use.

REFERENCE SIGNS

1: handle; 2: silicone leather sheath; 3: third motor; 4: rotating shaft; 5: swing arm; 6: motor cover; 7: fourth motor; 8: first motor; 9: rotating block; 10: connecting rod; 11: mouth linkage; 12: second motor; 13: PCBA board; 14: magnetic charging needle; 15: battery; 16: driving block; 17: massage block; 21: left cover; 22: right cover; 23: reduction motor; 24: rotating track fastener; 25: connecting part; 26: rotating track; 27: pin; 28: swing arm; and 29: flapping plate.

DETAILED DESCRIPTION OF THE EMBODIMENTS

The technical solutions in the embodiments of the present disclosure are clearly and completely described below with reference to the accompanying drawings in the embodiments of the present disclosure. Apparently, the described embodiments are only some rather than all of the embodiments of the present disclosure. All other embodiments obtained by those of ordinary skill in the art in accordance with the embodiments of the present disclosure without making creative efforts shall fall within the protection scope of the present disclosure.

Embodiment I

Figure 1:
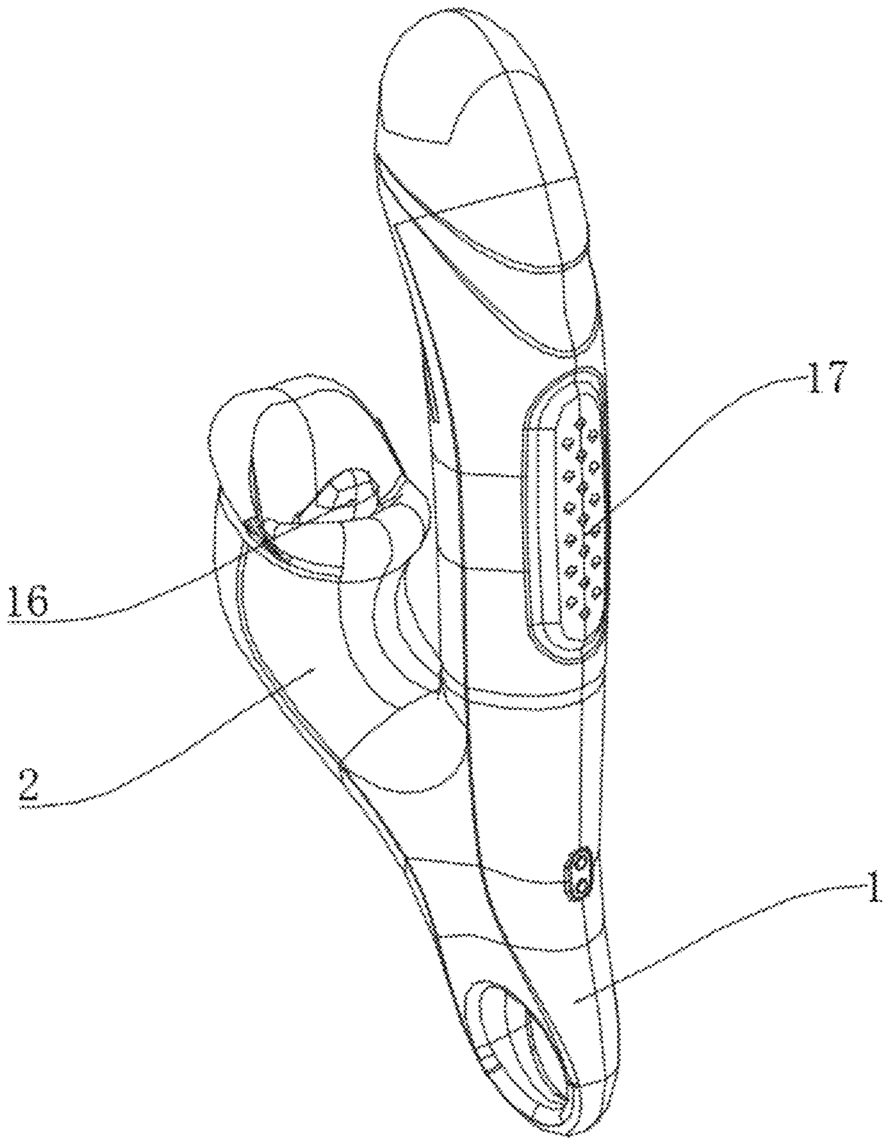
FIG. 1 is a three-dimensional view of a biting massager proposed by the present disclosure.
Figure 2:
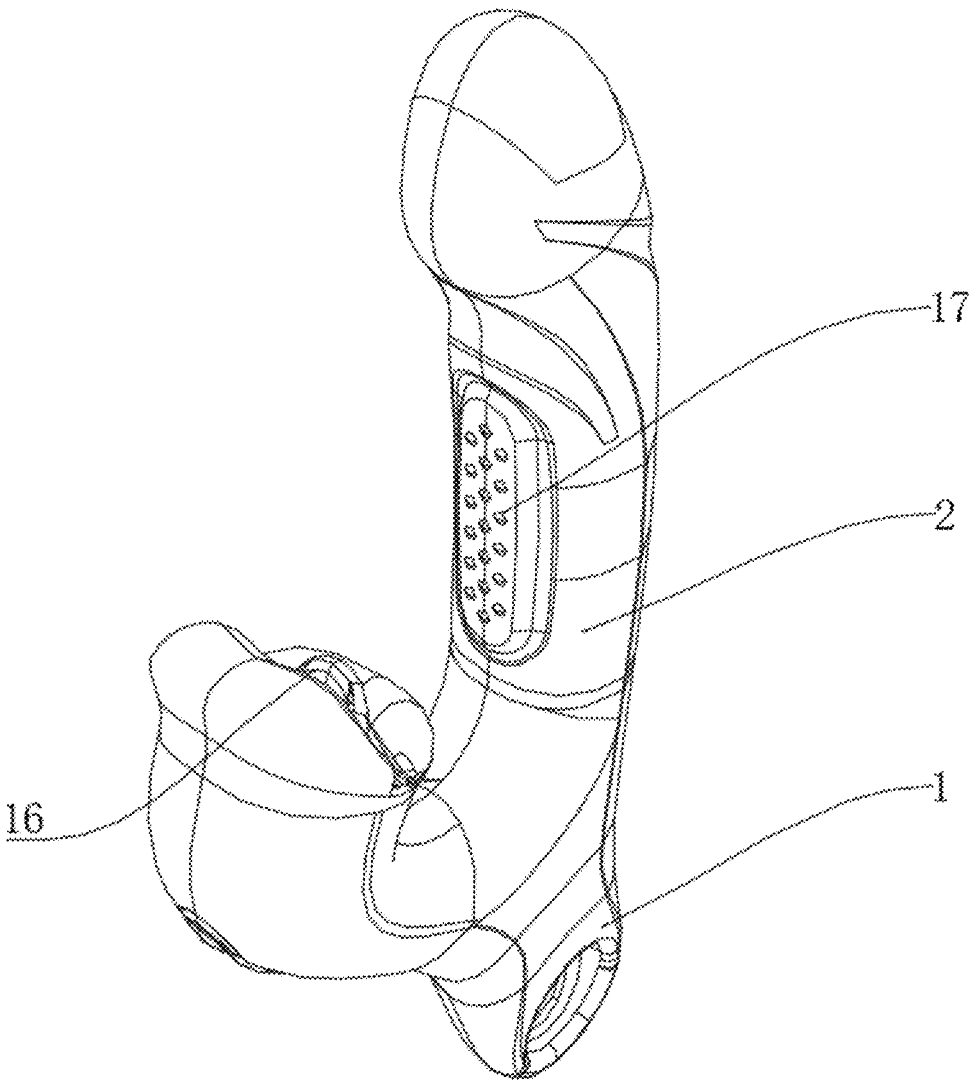
FIG. 2 is a schematic structural diagram of a massage block of a biting massager proposed by the present disclosure.
Figure 3:
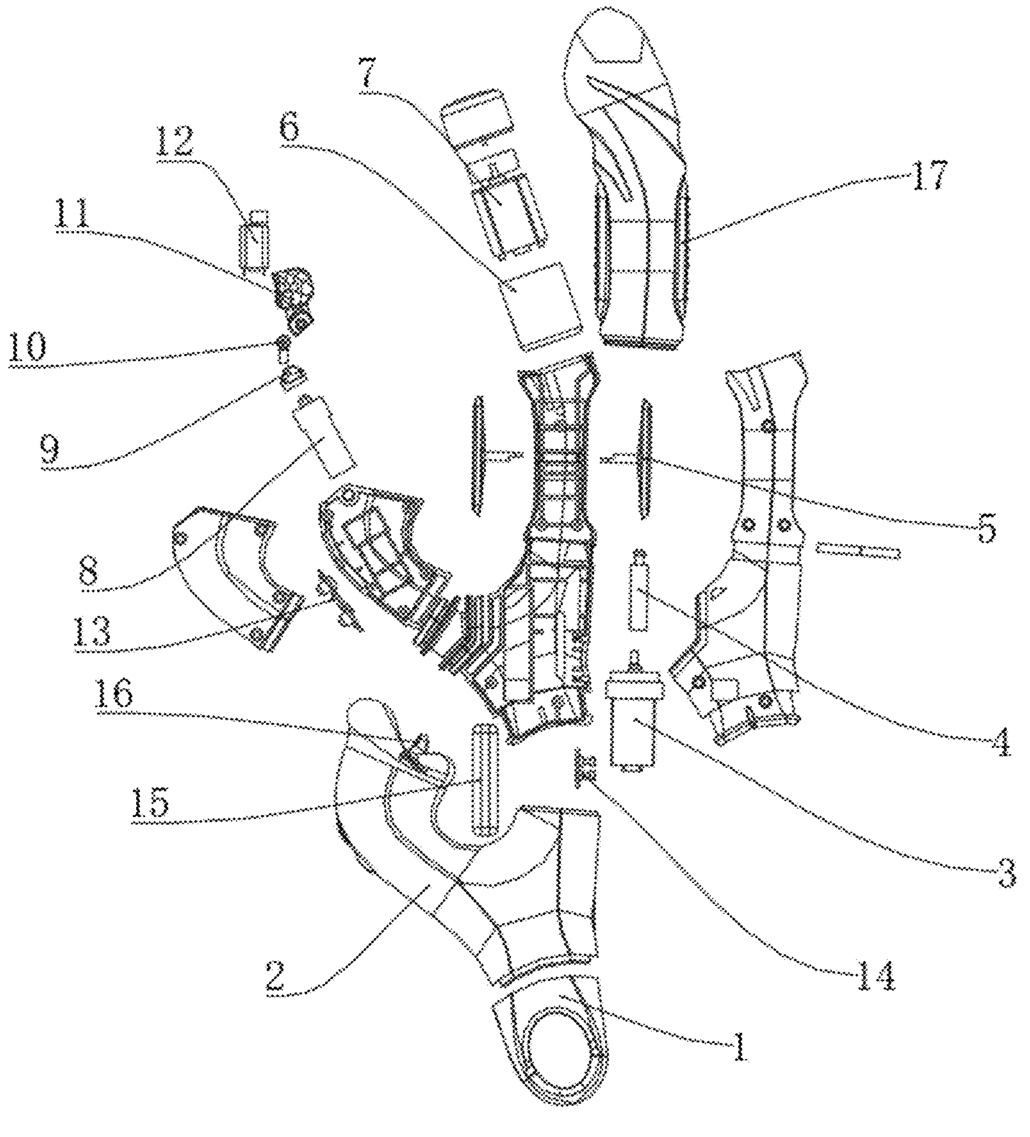
FIG. 3 is an exploded view of a biting massager proposed by the present disclosure.

Referring to FIGS. 1-3, an embodiment provided by the present disclosure is a biting massager, including a handle 1, where the top of the handle 1 is fixedly connected to a silicone leather sheath 2, a flapping assembly is installed on the right inner side of the silicone leather sheath 2, a first motor 8 is fixedly connected to the left inner side of the silicone leather sheath 2, an output end of the first motor 8 is fixedly connected to a rotating block 9, the upper side of the rotating block 9 is fixedly connected to a connecting rod 10, the upper side of the connecting rod 10 is fixedly connected to a mouth linkage 11, a second motor 12 is fixedly connected to the upper left inner side of the silicone leather sheath 2, a driving block 16 is installed on the upper left side of the handle 1, a PCBA board 13 is fixedly connected to the left side of the silicone leather sheath 2, a battery 15 is fixedly connected to the inside of the silicone leather sheath 2, the battery 15 is electrically connected to the second motor 12 and the first motor 8, and a magnetic charging needle 14 is fixedly connected to the right side of the silicone leather sheath 2.

Specifically, a through hole is formed in the lower side of the handle 1 so that the handle can be hung conveniently inside a room; the handle 1 plays a role in fixing the silicone leather sheath 2 so that the silicone leather sheath 2 can perform massage stably; the silicone leather sheath 2 is made of silicone with the advantages of high temperature resistance, easy cleaning, long service life, softness and comfort, environmental protection, and non-toxicity, making the massager more convenient to use; the silicone leather sheath 2 supports and fixes the first motor 8 so that the first motor will not shake during operation; by starting the first motor 8 to operate, the first motor 8 drives the rotating block 9 to rotate stably, and then the rotating block 9 drives the connecting rod 10 to rotate smoothly so that the rotating block 9 drives one end of the connecting rod 10 to rotate smoothly and the other end of the connecting rod 10 drives the mouth linkage 11 to make a reciprocating swing motion, thereby achieving a biting effect, and at this time, by starting the second motor 12 to operate, the upper left side of the silicone leather sheath 2 is driven to vibrate, thereby achieving a unilateral biting motion and vibration, and the vibration and the biting motion can work separately or jointly through a driving plate, thereby enabling a user to get relaxed in a short time; and the PCBA board 13 acts as a controller of the massager to control the massager to be used flexibly.

Referring to FIGS. 1-3, the flapping assembly includes a third motor 3, two massage blocks 17, and a motor cover 6, where the third motor 3 is fixedly connected to the right inner side of the silicone leather sheath 2, the battery 15 is electrically connected to the third motor 3, an output end of the third motor 3 is fixedly connected to a rotating shaft 4, the outside of the rotating shaft 4 is rotatably connected to two swing arms 5, the two massage blocks 17 are respectively arranged on the left and right sides of the silicone leather sheath 2, the outside of the motor cover 6 is fixedly connected to the upper inner side of the silicone leather sheath 2, a fourth motor 7 is fixedly connected inside the motor cover 6, and the battery 15 is electrically connected to the fourth motor 7.

Specifically, the silicone leather sheath 2 plays a role in fixing the third motor 3 inside thereof so that the third motor 3 will not shake when rotating; the battery 15 provides power to the third motor 3 and the fourth motor 7 so that they can operate; by starting the fourth motor 7 to operate, the fourth motor 7 shakes to drive the top of the silicone leather sheath 2 to vibrate; by starting the third motor 3 to operate, the third motor 3 stably drives the rotating shaft 4 to rotate, and then the rotating shaft 4 drives the swing arms 5 to make a reciprocating motion so that the swing arms 5 push the massage blocks 17 to make a reciprocating motion, thereby achieving rapid flapping and working separately or jointly with flapping to further improve flexibility in use.

Referring to FIG. 3, the outside of the rotating block 9 is movably connected to the inside of the silicone leather sheath 2, the outside of the connecting rod 10 is rotatably connected to the inside of the silicone leather sheath 2, the outside of the mouth linkage 11 is movably connected to the inside of the silicone leather sheath 2, and an output end of the second motor 12 is fixedly connected to the upper side of the mouth linkage 11.

Specifically, the silicone leather sheath 2 plays a limiting role on the rotating block 9, the connecting rod 10, and the mouth linkage 11 inside thereof to ensure smooth operation so that the right side of the silicone leather sheath 2 shakes smoothly, thereby achieving a better massage effect; and by starting the second motor 12 to operate, the second motor 12 drives the mouth linkage 11 to shake and cooperate with shaking generated when the second motor 12 is operating, thereby achieving a biting effect.

Referring to FIG. 3, an output end of the fourth motor 7 is in contact with the inner sides of the swing arms 5, the outside of the rotating shaft 4 is rotatably connected to the inside of the silicone leather sheath 2, the outsides of the swing arms 5 are slidably connected to the inside of the silicone leather sheath 2, and the inner sides of the massage blocks 17 are in contact with the outer sides of the swing arms 5.

Specifically, the silicone leather sheath 2 plays a limiting role on the rotating shaft 4 and the swing arms 5 inside thereof to ensure smooth operation; by starting the fourth motor 7 to operate, the fourth motor 7 assists the swing arms 5 in swinging, thereby making the swing arms 5 swing with a larger amplitude; and when the swing arms 5 swing, the swing arms 5 drive the massage blocks 17 to make a reciprocating motion, thereby meeting different massage needs.

Embodiment II

Figure 4:
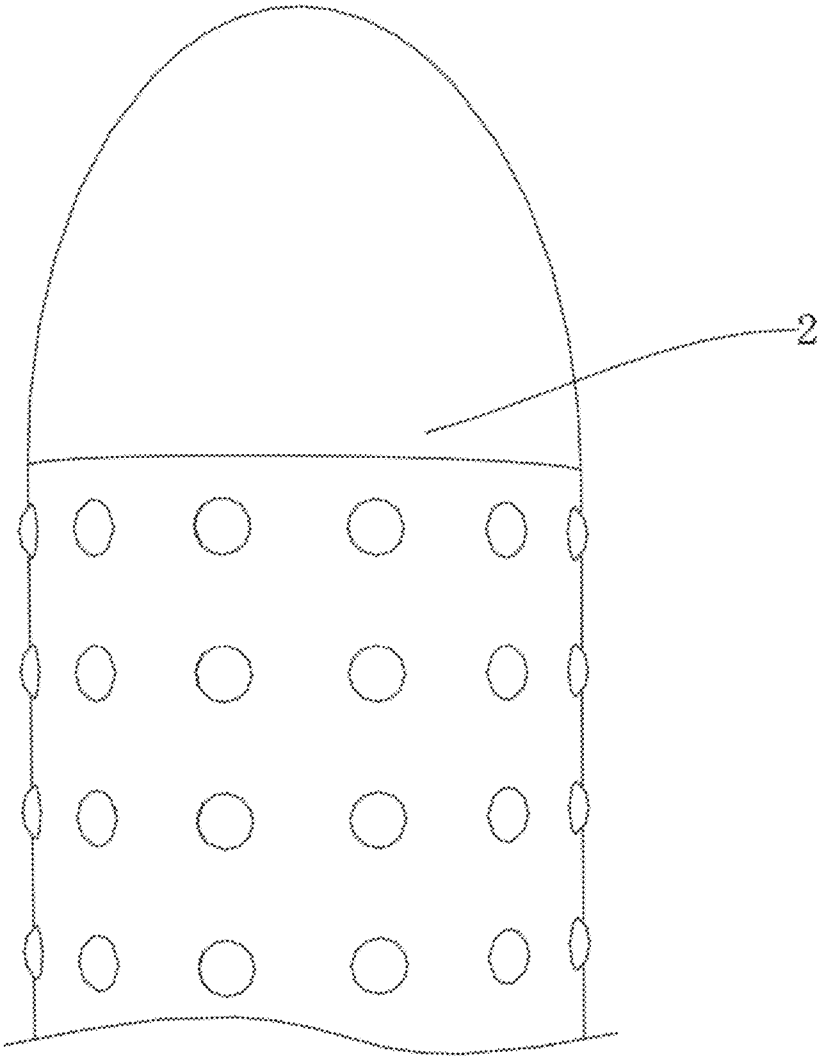
FIG. 4 is a schematic structural diagram of a silicone leather sheath in an embodiment II of the present disclosure.

Referring to FIG. 4, the upper side of the silicone leather sheath 2 is provided with bumps.

Specifically, the bumps are distributed on the upper side of the silicone leather sheath 2 to ensure adequate protection in these critical areas. In other areas, the bumps are relatively sparsely distributed to reduce unnecessary friction and resistance, thereby achieving optimal grip and protection.

Embodiment III

Figure 5:
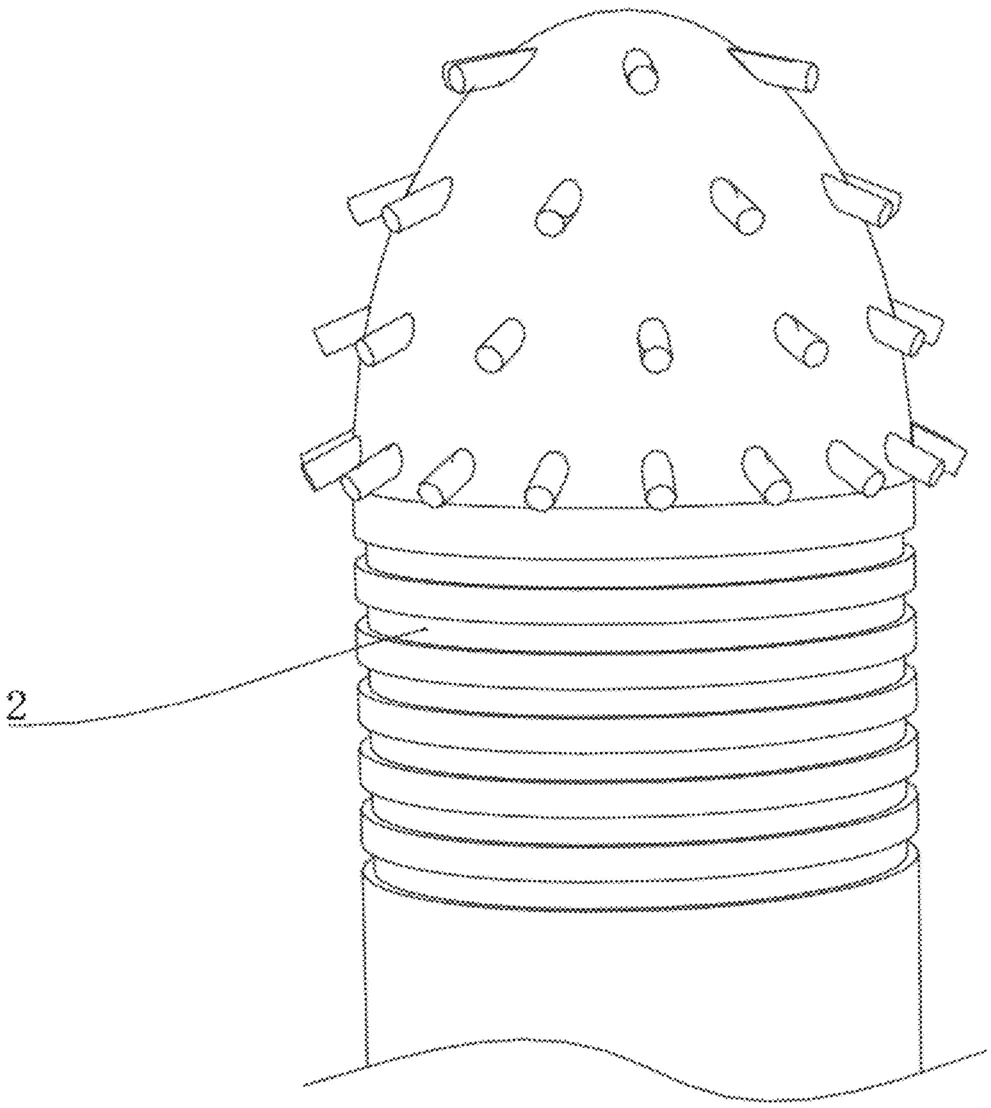
FIG. 5 is a schematic structural diagram of a silicone leather sheath in an embodiment III of the present disclosure.

Referring to FIG. 5, the upper side of the silicone leather sheath 2 is provided with horizontal grooves, and the top of the silicone leather sheath 2 is provided with convex strips.

Specifically, the horizontal grooves are designed to enhance massage intensity and provide a better massage experience; in addition, the horizontal grooves further play an anti-slip role to some extent, thereby achieving more stable massage and avoiding accidental falls caused by slippery hands. The convex strips can achieve flapping effects on massage sites, thereby improving the massage experience.

Embodiment IV

Figure 6:
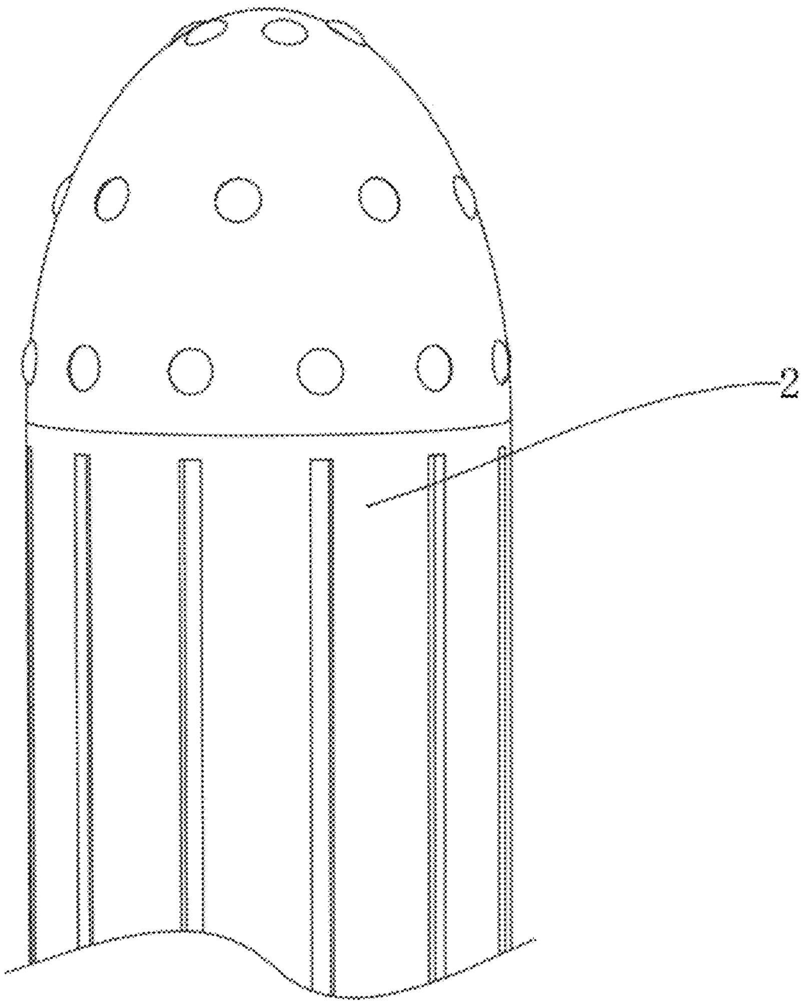
FIG. 6 is a schematic structural diagram of a silicone leather sheath in an embodiment IV of the present disclosure.

Referring to FIG. 6, the upper side of the silicone leather sheath 2 is provided with vertical grooves, and the top of the silicone leather sheath 2 is provided with convex dots.

Specifically, the convex dots are designed to combine with the vertical grooves to perform intermittent massage on massage sites, thereby achieving appropriate relaxation and more concentrated intensity at the massage sites, further achieving a rapid relaxation effect.

The silicone leather sheaths 2 in the embodiments I, II, III, and IV can be replaced with each other so that a user can select the corresponding silicone leather sheath 2 as needed, thereby achieving high flexibility in use, a good massage experience, and superior usage economy.

Embodiment V

Figure 7:
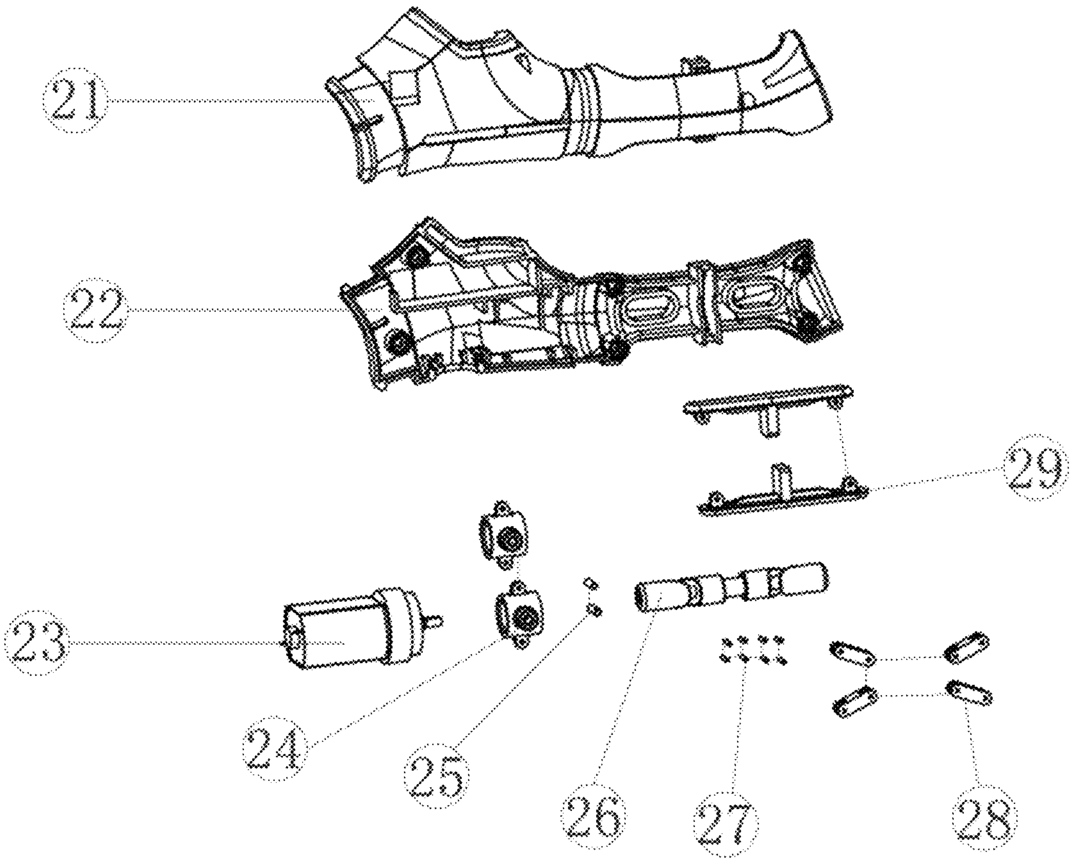
FIG. 7 is a schematic structural diagram of a biting massager in an embodiment V of the present disclosure.

Referring to FIG. 7, the massager further includes a reduction motor 23, where an output end of the reduction motor 23 is fixedly connected to a rotating track 26; rotating track fasteners 24 are aligned with both sides of the rotating track 26; φ0.0 steel dowels are inserted into fixed holes in the rotating track; the swing arms 28 are installed on the rotating track fasteners 24 and fixed with the steel dowels; flapping plates 29 are fixed on the swing arms with the steel dowels; the reduction motor 23 is installed on the rotating track 26; the reduction motor 23, the rotating track fasteners 24, connecting parts 25, the rotating track 26, pins 27, the swing arms 28, and the flapping plates 29 assembled in place are all put into a right cover 22; and a left cover 21 is used to fix an outer shell.

Specifically, the motor 23 drives the rotating track fasteners 24 to rotate and the rotating track 26 to make a reciprocating sliding motion left and right, and the rotating track fasteners 24 drive the swing arms 28 to cause the flapping plates 29 to make an up and down flapping action, thereby achieving a good massage experience and convenience of use with a reasonable structural design.

Working principle: when the massager needs to be used, by starting the third motor 3 to operate, the third motor 3 drives the rotating shaft 4 to rotate, and then the rotating shaft 4 drives the swing arms 5 to make a reciprocating swing motion so that the swing arms 5 push the massage blocks 17 to make biting motions, thereby performing massage at a massage site; by starting the fourth motor 7 to operate, the fourth motor 7 shakes to drive the upper side of the silicone leather sheath 2 to swing, thereby converting a rotational motion into an up-and-down swinging motion and achieving rapid flapping and working separately or jointly with flapping to further improve flexibility in use; by starting the first motor 8 to operate, the first motor 8 drives the rotating block 9 to rotate, and then the rotating block 9 drives the connecting rod 10 to rotate so that the connecting rod 10 drives the mouth linkage 11 to make a reciprocating swing motion and the mouth linkage 11 drives the driving block 16 to swing; and by starting the second motor 12 to operate, the left side of the silicone leather sheath 2 is driven to vibrate, thereby achieving a unilateral biting motion and vibration, and the vibration and the biting motion can work separately or jointly through the driving plate.

Finally, it should be noted that the above-described embodiments are only exemplary embodiments of the present disclosure and are not intended to limit the present disclosure. Although the present disclosure has been described in detail with reference to the above-described embodiments, those skilled in the art can still modify the technical solutions stated in the above-described embodiments or replace some of the technical features thereof with equivalents. Any modification, equivalent replacement, or improvement made within the spirit and principle of the present disclosure shall fall within the protection scope of the present disclosure.

What is claimed is:

1. A sexual stimulation device with an artificial lip structure, comprising:

the artificial lip structure, comprising upper and lower lip assemblies, and an opening defined by the upper and lower lip assemblies;

at least one driving device, configured to drive the artificial lip structure to make a biting motion in a first direction;

a power supply, configured to provide power to the at least one driving device;

an inner space, configured to accommodate the at least one driving device and the power supply;

a silicone leather sheath comprising a first end and a second end longer than the first end, wherein the artificial lip structure is provided at the first end, and the opening of the artificial lip structure faces toward the second end; and an intermediate connecting assembly disposed in the inner space, wherein the intermediate connecting assembly connects the at least one driving device and the artificial lip structure, and wherein the at least one driving device comprises a first motor, the first motor comprises an output end configured to rotate, and the intermediate connecting assembly is configured to convert rotation of the output end of the first motor into the biting motion of the artificial lip structure in the first direction.

2. The sexual stimulation device of claim 1, wherein the biting motion in the first direction comprises a relative motion of the upper and lower lip assemblies in the first direction.

3. The sexual stimulation device of claim 1, wherein the artificial lip structure further comprises a driving block disposed in the opening, the driving block is driven by the at least one driving device, and the biting motion in the first direction comprises swinging of the driving block in the first direction.

4. The sexual stimulation device of claim 1, wherein the intermediate connecting assembly comprises a rotating block, a first end of the rotating block is connected to the output end of the first motor, and the output end of the first motor drives the rotating block to rotate.

5. The sexual stimulation device of claim 4, wherein the intermediate connecting assembly further comprises a connecting rod, a first end of the connecting rod is connected to a second end of the rotating block, and the rotating block drives the connecting rod to rotate.

6. The sexual stimulation device of claim 5, wherein the intermediate connecting assembly further comprises a mouth linkage, a first end of the mouth linkage is connected to a second end of the connecting rod, and the connecting rod drives the mouth linkage to swing.

7. The sexual stimulation device of claim 6, wherein a second end of the mouth linkage is connected to the driving block, and the mouth linkage drives the driving block to swing in the first direction.

8. The sexual stimulation device of claim 7, wherein the at least one driving device further comprises a second motor, and an output end of the second motor is connected to the mouth linkage and drives the mouth linkage to shake, thereby driving the driving block to shake.

9. The sexual stimulation device of claim 1, further comprising:

a handle;

wherein the silicone leather sheath is connected to the top of the handle.

10. The sexual stimulation device of claim 9, further comprising:

two massage blocks respectively disposed on left and right sides of the second end of the silicone leather sheath.

11. The sexual stimulation device of claim 10, wherein the at least one driving device comprises a massage motor disposed in the second end of the silicone leather sheath, and the massage motor is configured to drive the two massage blocks to make a reciprocating motion.

12. The sexual stimulation device of claim 11, wherein the at least one driving device further comprises a vibrate motor disposed in the second end of the silicone leather sheath, and the vibrate motor is configured to drive the second end of the silicone leather sheath to vibrate.

13. The sexual stimulation device of claim 12, further comprising:

a printed circuit board assembly (PCBA) board disposed in the first end of the silicone leather sheath, wherein the PCBA board is configured to make the reciprocating motion of the two massage blocks, the vibration of the second end of the silicone leather sheath, and the biting motion of the artificial lip structure work jointly or separately.

14. The sexual stimulation device of claim 11, further comprising a rotating shaft and two swing arms disposed in the second end of the silicone leather sheath, wherein an output end of the massage motor is connected to the rotating shaft, the rotating shaft is connected to the two swing arms, inner sides of the two massage blocks are in contact with outer sides of the two swing arms, and the massage motor is configured to drive the two massage blocks to make a reciprocating motion through the rotating shaft and the two swing arms.

* * * * *